(12) United States Patent
Gilbert (10) Patent No.: US 7,717,214 B2
(45) Date of Patent: May 18, 2010

(54) MOTORCYCLE WITH COUNTERSHAFT AND ADJUSTABLE MOTOR MOUNT

(76) Inventor: Jerry L. Gilbert, 13300 Bothell-Everett Hwy. #611, Mill Creek, WA (US) 98012

( * ) Notice: Subject to any disclaimer, the term of this patent is extended or adjusted under 35 U.S.C. 154(b) by 314 days.

(21) Appl. No.: 11/775,766

(22) Filed: Jul. 10, 2007

(65) Prior Publication Data

US 2008/0041650 A1    Feb. 21, 2008

Related U.S. Application Data

(60) Provisional application No. 60/819,841, filed on Jul. 10, 2006.

(51) Int. Cl.
*B62K 11/00* (2006.01)
(52) U.S. Cl. ..................................... 180/228
(58) Field of Classification Search ................. 180/228, 180/312
See application file for complete search history.

(56) References Cited

U.S. PATENT DOCUMENTS

| | | |
|---|---|---|
| 4,641,810 A | 2/1987 | Ott |
| 5,829,730 A | 11/1998 | Ott |
| 6,230,837 B1 | 5/2001 | Soileau |
| 6,523,631 B2 * | 2/2003 | Uneta et al. .................. 180/228 |
| 6,575,260 B2 | 6/2003 | Bourget |
| 6,755,272 B2 | 6/2004 | Friesen |
| 7,163,074 B2 | 1/2007 | Inomori |
| 7,201,246 B2 * | 4/2007 | Brendelson et al. .......... 180/228 |
| 2004/0007409 A1 * | 1/2004 | Keller et al. ................. 180/228 |
| 2004/0154851 A1 * | 8/2004 | Massicotte et al. ........... 180/190 |

* cited by examiner

*Primary Examiner*—Lesley Morris
*Assistant Examiner*—Jacob Knutson
(74) *Attorney, Agent, or Firm*—Christensen O'Connor Johnson Kindness PLLC (57) ABSTRACT

A motorcycle having a frame, front and rear wheel assemblies and a motor and transmission assembly. The motor and transmission assembly attaches to the frame through a front mounting assembly and a rear mounting assembly such that the motor is selectively movable horizontally with respect to the frame. The front and rear mounting assemblies are preferably isolation mounted to dampen vibrations from the motor to the frame. In an embodiment a countershaft is mounted to the frame, the countershaft having a drive sprocket on one side, and a driven sprocket on the opposite side. Therefore, the transmission power take-off engages the countershaft through a chain on one side of the motorcycle, and the rear wheel assembly engages the countershaft through a chain on the other side of the motorcycle. Because the horizontal position of the motor is adjustable, the transmission chain can be adjusted independently of the rear wheel chain.

20 Claims, 7 Drawing Sheets

MOTORCYCLE WITH COUNTERSHAFT AND ADJUSTABLE MOTOR MOUNT

CROSS-REFERENCE TO RELATED APPLICATION

This application claims the benefit of U.S. Provisional Patent Application No. 60/819,841, filed Jul. 10, 2006, the disclosure of which is hereby expressly incorporated by reference in its entirety, and priority from the filing date of which is hereby claimed under 35 U.S.C. §119.

BACKGROUND

A popular modification for existing motorcycles, including for example the Harley-Davidson Sportster® model, is the use of a wider rear tire. The reasons for the modification varies from rider to rider, and may include both aesthetic and functional aspects. The wider rear tire, for example, provides a smoother ride on a rigid or stiffly suspended frame, and tends to not follow rain grooves on the freeway as much as skinnier standard tires.

Of course, a wider rear tire generally displaces the wheel drive gear or sprocket laterally farther from the centerline of the wheel. Different schemes for accommodating a wider rear tire have been proposed. For example, in U.S. Pat. No. 5,996,718 to Desrosiers discloses a swing arm assembly that allows for the installation of an oversized rear wheel tire on a Harley-Davidson Softail™ motorcycle is disclosed. In U.S. Pat. No. 6,230,837 to Soileau, an improvement that allows for the front and rear tires to be aligned on the same centerline is disclosed, which appears to be intended for use with a single chain or drive belt connecting the transmission power take-off to the rear wheel. In U.S. Pat. No. 6,575,260 to Bourget, which is hereby incorporated by reference in its entirety, an intermediate jack shaft having two sprockets spaced apart by 2-4 inches, on one end of the shaft is disclosed. One chain connects one sprocket of the intermediate shaft to the transmission power take-off, and a second chain connects the other sprocket of the intermediate shaft to the rear wheel.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A motorcycle and motorcycle motor mount assembly is disclosed wherein the horizontal position of the motor and transmission assembly can be adjusted. The motorcycle includes a frame, a motor and transmission assembly, a front wheel assembly and a rear wheel assembly. A front motor mount assembly and a rear motor mount assembly cooperatively attach the motor and transmission assembly to the frame. The motor mount assemblies are movably horizontally, such that the horizontal position of the motor and transmission assembly can be adjusted horizontally by an amount, for example by 0.35 inches to 0.75 inches.

In an embodiment of the invention the front and/or rear motor mount assemblies are isolation-type mounts such that vibrations to the motorcycle frame are damped. The motor mount assemblies may include a cylindrical bearing sleeve, a rigid axial member, and a plurality of annular bushings disposed in the sleeve, wherein the bushings have a polymeric outer portion.

In an embodiment of the invention a countershaft assembly is mounted to the frame that transfers the drive from one side of the frame to the other. In an embodiment, the countershaft includes a driven sprocket on one side of the frame that engages the motor and transmission assembly, and a drive sprocket on an opposite side of the frame that drivably engages the rear wheel assembly. The countershaft assembly may include an axle fixed to the frame, and a cylindrical countershaft body that rotatably engages the axle through a plurality of bearing assemblies.

In an embodiment of the invention the drive gear on the countershaft is positioned to accommodate a rear tire having a width between about 200 mm and 300 mm inclusive.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A particular embodiment of a motorcycle 100 including a countershaft and motor mount assembly will now be described with reference to the FIGURES, to aid the artisan in understanding the present invention.

Figure 1:
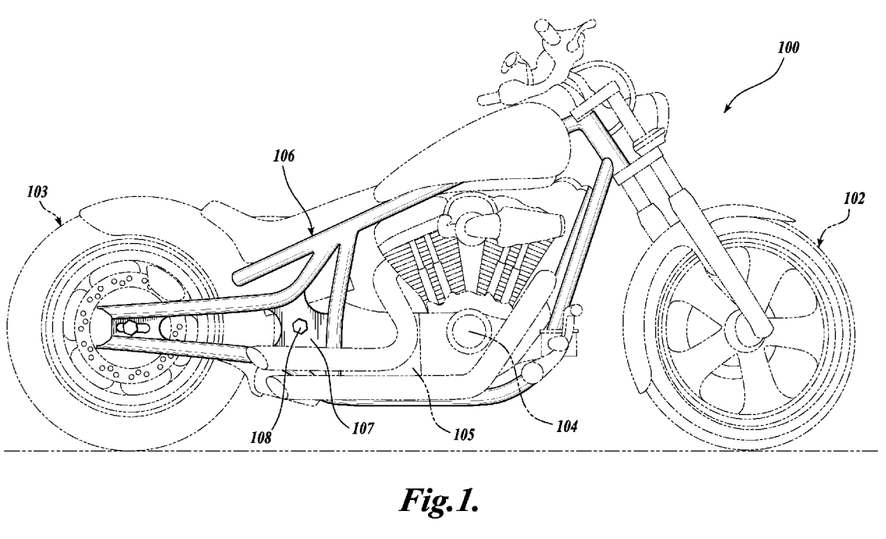
FIG. 1 shows an environmental view of a motorcycle in accordance with the present invention.

FIG. 1 shows an environmental view of the motorcycle 100 with well-known components shown in phantom to better illustrate the novel aspects of the countershaft and motor mount assembly. The motorcycle 100 includes a front wheel assembly 102, including the front fork, handlebars and the like, as are well-known in the art, a rear wheel assembly 103, a motor 104, for example a 45 degree V-twin engine such as the Ironhead™ or Evolution™ engine and transmission 105, that may be disposed in common housing with the motor 104. The motor 104 and the transmission 105 define a motor and transmission assembly. The various components are mounted to a frame 106. The motor 104 and transmission 105 are located at an interior portion of the frame 106, and the rider sits generally over and/or behind the motor 104.

Figure 2:
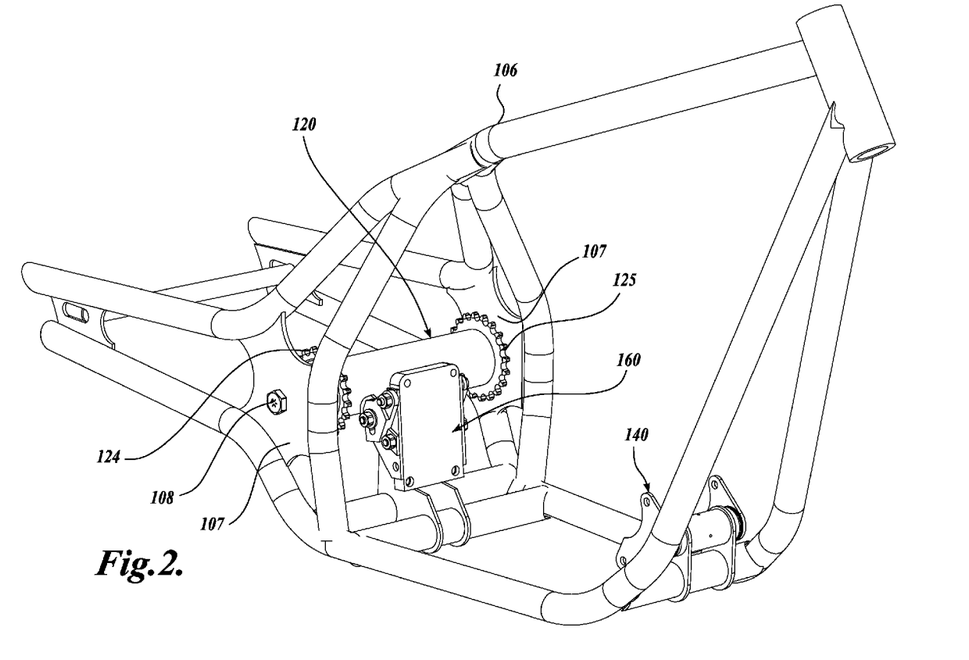
FIG. 2 is a perspective view of a motorcycle frame for the motorcycle shown in FIG. 1, and showing the countershaft and the front and rear motor mounts.

Referring now to FIG. 2, which shows the frame 106 with a countershaft assembly 120, front motor mount assembly 140, and a rear motor mount assembly 160 attached thereto. The frame includes oppositely-disposed frame countershaft supports 107 that are fixedly attached to the frame 106. The countershaft supports 107 each include an aperture (not visible in FIG. 2) for attaching the countershaft 120 to the frame.

A novel aspect of the countershaft assembly 120 is that a driven sprocket 124, which is driven by the power take-off from the transmission 105, is disposed opposite a drive sprocket 125, which drives the rear wheel, such that the driven sprocket 124 and the drive sprocket 125 are disposed on opposite sides of the frame 106. This allows the motorcycle 100 to use a right-side transmission 105 power take-out, for example, with a left-side drive rear wheel assembly 103.

Figure 3:
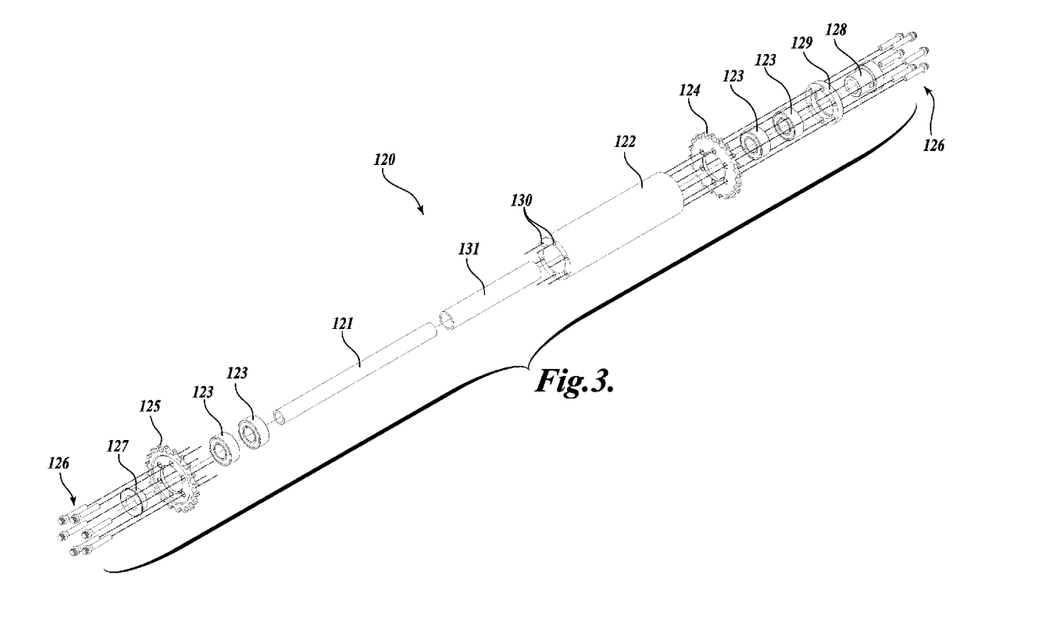
FIG. 3 is an exploded perspective view of the countershaft shown in FIG. 2.

An exploded view of the countershaft assembly 120 is shown in FIG. 3. In this embodiment, the countershaft assembly 120 includes an axle 121 that is fixed to the frame 106 with bolts 108 that extend through the frame countershaft supports 107 (see, FIG. 2). A generally tubular countershaft body 122 is rotatably mounted to the axle 121 with a plurality of bearing assemblies 123, for example roller bearings. A plurality of threaded apertures 130 are provided at each end of the countershaft body. A tubular bearing spacer 131 is disposed over the axle 121 and between the sets of bearing assemblies 123, to suitably locate the bearing assemblies 123 thereon. The driven sprocket 124 is attached to one end of the countershaft body 122, and the drive sprocket 125 is attached to the opposite end of the countershaft body 122, each with a plurality of bolts 126 that threadably engage the apertures 130. The horizontal position of the drive sprocket 125 is a design variable that may be selected to align with the driven sprocket (not shown) on the rear wheel assembly 103. In a preferred embodiment the drive sprocket 125 is located to accommodate a wheel having a tire that is 200 mm-300 mm wide, inclusive.

A countershaft bearing retainer cap 129 is also provided, as shown. A drive-side countershaft spacer 127 and a driven-side countershaft spacer 128 are provided to establish the desired transverse position of the countershaft assembly 120, and also providing a desired compression to the bearing assemblies 123.

It will now be understood that the countershaft assembly 120 is mounted at a fixed position to the frame 106, such that the countershaft body 122 and the attached, oppositely-disposed sprockets 124, 125 are rotatable. It will also be appreciated that the rear wheel assembly 103 may be mounted to the frame 106 in a conventional manner to accommodate a chain (not shown) between the rear wheel drive sprocket and the countershaft drive sprocket 125.

Figure 4:
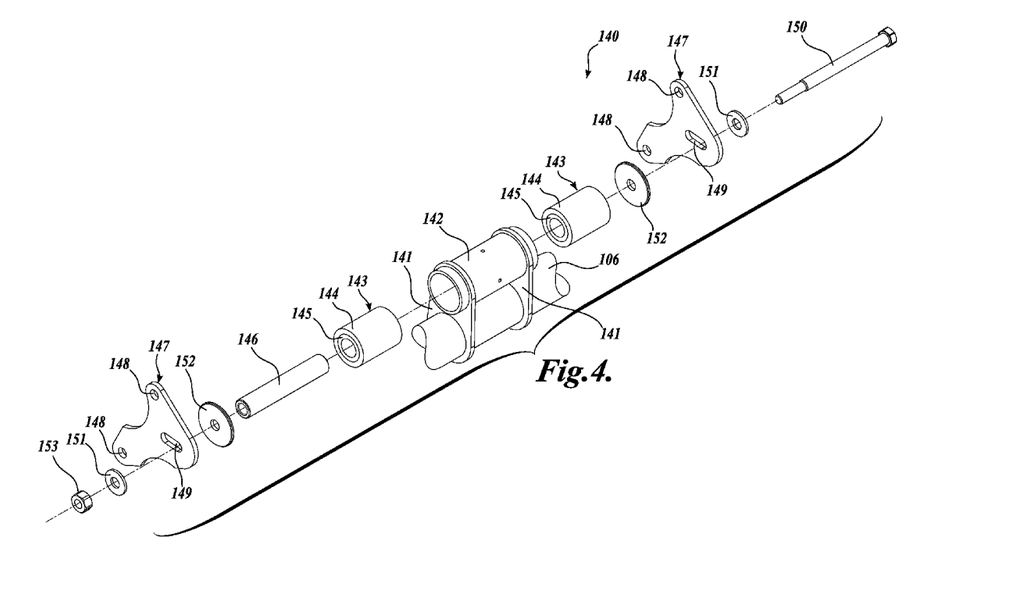
FIG. 4 is an exploded perspective view of the front motor mount shown in FIG. 2.

An exploded perspective view of the front motor mount assembly 140 is shown in FIG. 4. Although it is not required, in a preferred embodiment the front motor mount assembly 140 is an isolation type mount that greatly reduces the vibrations transmitted from the motor 104 to the frame 106. The front motor mount assembly 140 is fixed to the frame 106 (fragment shown) with a pair of mounting supports 141. For example the mounting supports 141 may be welded to the frame 106. A tubular bearing sleeve 142 is fixedly attached to the mounting supports 141. The bearing sleeve 142 preferably is formed with a central internal annular projection or ledge (not shown) that provides a stop for oppositely disposed bushings 143. The bushings 143 include an outer tubular polymeric portion 144 having an outer surface that engages the inner surface of the bearing sleeve 142, and a tubular metal inner cylinder 145. An inner bearing tube 146 is inserted axially through both bushings 143.

Left and right side plates 147 are provided on opposite ends of the front motor mount assembly 140. The side plates 147 include apertures 148 that are sized and spaced to accommodate through bolts (not shown) that engage corresponding apertures in the front of the motor 104 and/or transmission 105. An elongate aperture or slot 149 is also provided for attaching the side plates 147 to the front motor mount assembly 140. A through bolt 150 extends through washers 151, 152, the side plate slots 149, and the inner bearing tube 146, and is secured with nut 153. The slot 149 is oriented such that when the side plates 147 are attached to the motor 104, the slot 149 is substantially horizontal, such that the side plates 147 can move horizontally a short distance defined by the length of the slot 149.

Figure 5A:
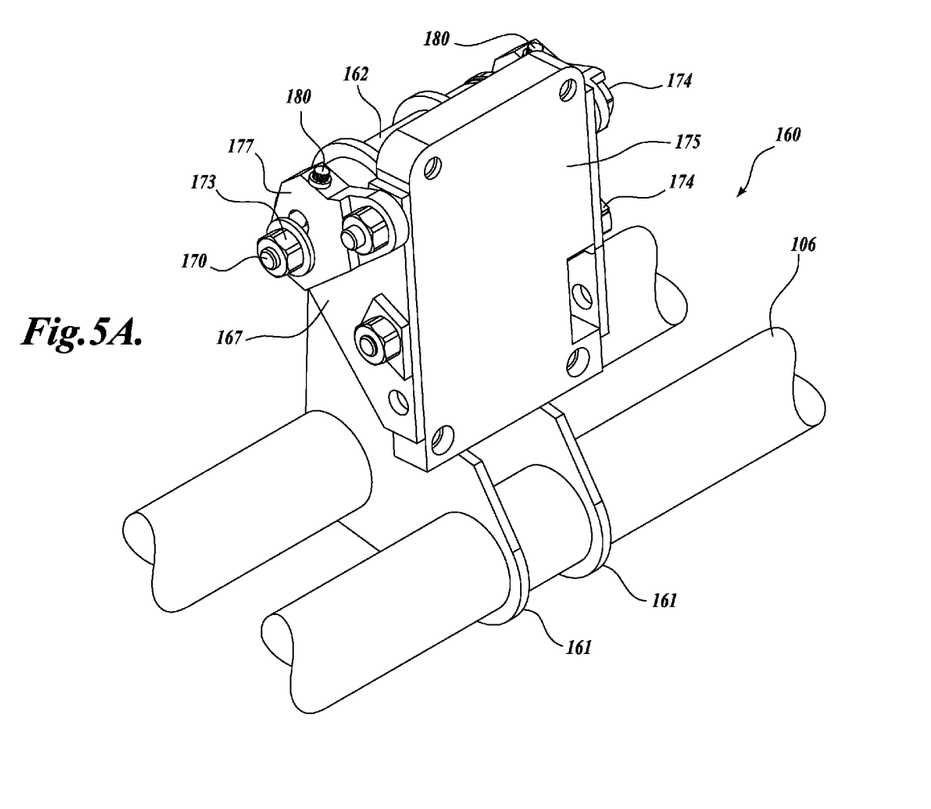
FIG. 5A is an assembled perspective view of the rear motor mount shown in FIG. 2.
Figure 5B:
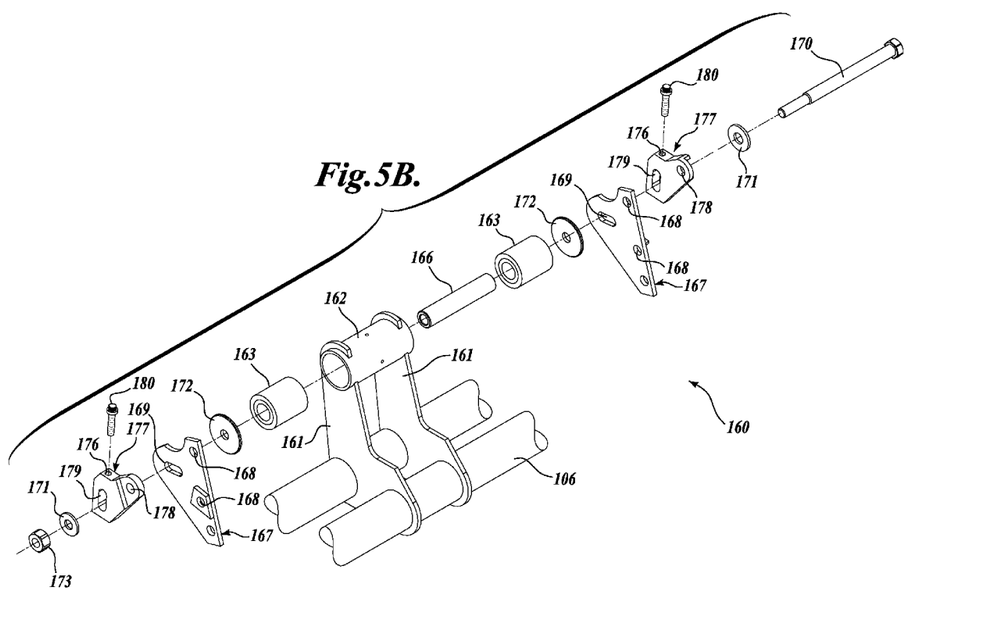
FIG. 5B is an exploded perspective view of the rear motor mount shown in FIG. 2.

A perspective assembled view of the rear motor mount assembly 160 is shown in FIG. 5A, and an exploded perspective view is shown in FIG. 5B (the motor mounting plate 175 and attaching bolts 174 are removed in the exploded view, for clarity). The rear motor mount assembly 160 is fixedly attached to the frame 106 with mounting supports 161, for example by welding the mounting supports 161 to the frame 106. A tubular bearing sleeve 162 is attached to the mounting supports 161. A pair of bushings 163, similar to the front motor mount assembly bushings 143, is disposed in the bearing sleeve 162, and an inner bearing tube 166 is axially disposed therethrough.

Left and right side plates 167 are pivotably attached on opposite sides of the rear motor mount assembly 160. The side plates include front apertures 168 that are adapted to receive through bolts 174 for attachment of the motor mounting plate 175. An elongate aperture or slot 169 is also provided for attaching the side plates to the rear motor mount assembly 160. The slot 169 extends substantially horizontally. Left and right adjuster plates 177 are disposed outboard and adjacent to the side plates 167. The adjuster plates 177 include a pivot aperture 178 and a substantially vertical or angled slot 179. A substantially vertical threaded aperture 176 extends from an upper surface of the adjuster plate 177 to the angles slot 179, and an adjuster screw 180 threadably engages the threaded aperture 176.

A through bolt 170 extends through washers 171, 172, the adjuster plate angled slots 179, and the inner bearing tube 166, and is retained by nut 173.

It will now be appreciated that the user can adjust the horizontal position of the motor mounting plate 175 by changing the position of the adjuster screw 180. In particular, as the adjuster screw 180 is screwed into the threaded aperture 176 it will engage the through bolt 170. Further advancing the adjuster screw 180 will cause the adjuster plate to pivot about the through bolt 174, which causes the side plates 167 and the motor mounting plate 175 to move horizontally because the side plates 167 are constrained to move horizontally by the engagement of the slot 169 with the through bolt 170.

Figure 6:
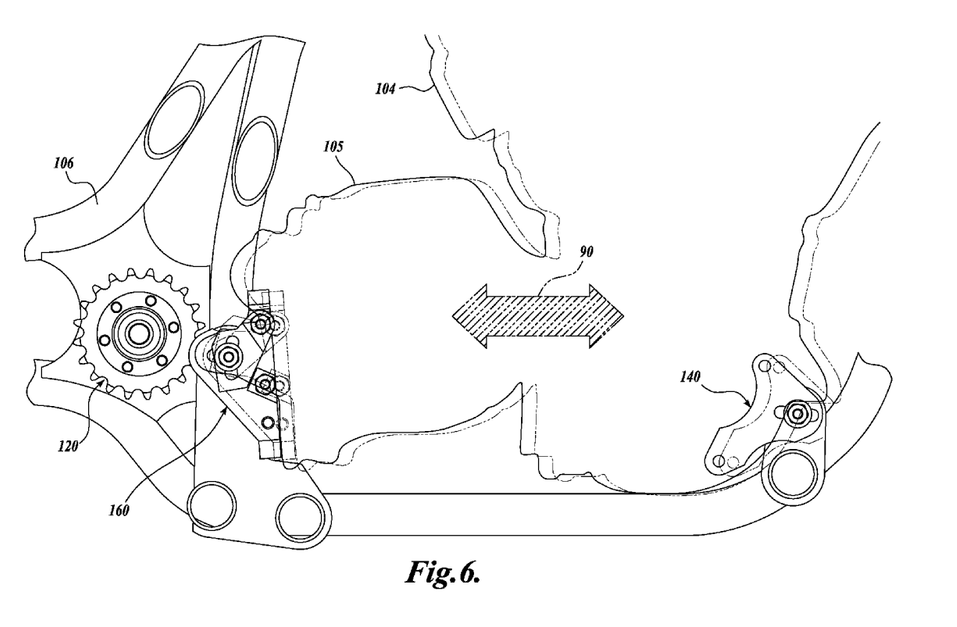
FIG. 6 is a fragmentary view of the motorcycle shown in FIG. 1, showing horizontal displacement of the motor and transmission by adjusting the motor mounts.

FIG. 6 shows a center portion of the frame 106, the motor 104 and transmission 105 (in outline) and the front and rear motor mount assemblies 140, 160. The solid lines show the position of the motor 104 and motor mount assemblies 140, 160 in the rearmost position, and the dashed lines show these components in the forward most position, the adjustability indicated by the arrow 90.

Therefore, the disclosed motor mount assemblies 140, 160 allow the user to adjust the horizontal position of the motor 104 (and transmission 105), within a design range. The user can therefore achieve a desired spacing between the transmission 105 and the countershaft assembly 120. Moreover, the desired spacing can be adjusted without affecting the spacing between the rear wheel assembly 103 and the countershaft assembly 120. In the present application utilizing a countershaft this provides a major advantage because the wheel drive chain tension may be adjusted independently of the transmission power take-off chain. It is contemplated, for example, that it may be desirable to use different gearing to the rear wheel (either on different motorcycles, or modifying a given motorcycle for different users or different rides) by using a different sized driven sprocket 124 or drive sprocket 125 on the countershaft assembly 120. This is easily accommodated by adjusting the motor mount assemblies 140, 160. The maximum length that the motor 104 and transmission 105 assembly can be moved with the motor mount assemblies 140, 160 is limited generally by the length of the slots 149 and 169. In a current embodiment, the motor 104 and transmission 105 are movable horizontally relative to the frame of between about 0.35 inches and 0.75 inches.

Moreover, it should be appreciated that the disclosed embodiment provides two-point motor attachment to the frame 106, and the attachments are isolation mounts that greatly reduce the vibrations transmitted from the motor 104 to the frame 106, improving the comfort of the rider.

While illustrative embodiments have been illustrated and described, it will be appreciated that various changes can be made therein without departing from the spirit and scope of the invention. For example, although the embodiment was described with reference to chain drives, the system may be readily implemented for motorcycles using a toothed belt-type drive system instead of chains, as are known in the art. As used herein, the term "sprocket" is expressly defined to include toothed pulleys, as are well-known in the art. It is also contemplated that the engine mount assemblies 140, 160 may be simplified by making them hard mount to the frame, rather than the disclosed isolation mounts.

It is also contemplated that the disclosed frame, countershaft and engine mounting assemblies may be provided as a kit for modifying an existing motorcycle. For example, a user may elect to purchase a kit essentially of the components shown in FIG. 2, perhaps with a wide tire, and utilize the engine, front fork assembly and other components from a compatible existing motorcycle to build a customized motorcycle.

The embodiments of the invention in which an exclusive property or privilege is claimed are defined as follows:

1. A motorcycle comprising:
    a motorcycle frame;
    a motor and transmission assembly;
    a front wheel assembly connected to the motorcycle frame;
    a rear wheel assembly connected to the motorcycle frame;
    a first motor mount assembly that attaches a first end of the motor and transmission assembly to the frame, at least a portion of the first motor mount assembly being movable horizontally with respect to the motorcycle frame; and
    a second motor mount assembly that attaches a second end of the motor and transmission assembly to the frame, the second motor mount assembly being adjustable such that the position of at least a portion of the second motor mount assembly is adjustable horizontally with respect to the motorcycle frame;
    whereby the horizontal position of the motor and transmission assembly can be selectively adjusted by a predetermined amount.

2. The motorcycle of claim 1, wherein the predetermined amount of horizontal adjustment is between about 0.35 inches and 0.75 inches.

3. The motorcycle of claim 1, wherein the first and second motor mount assemblies are isolation mount assemblies such that vibrations to the motorcycle frame are damped by the first and second motor mount assemblies.

4. The motorcycle of claim 1, wherein the first motor mount assembly is a front motor mount assembly, and the second motor mount assembly is a rear motor mount assembly.

5. The motorcycle of claim 4, wherein the first and second motor mount assemblies each comprise a cylindrical bearing sleeve that is fixedly attached to the frame, a bushing disposed in the bearing sleeve having a polymeric outer portion and a tubular metal portion, and a rigid center member that extends through the tubular metal portion, wherein the motor and transmission assembly attaches to the first and second motor mount assemblies.

6. The motorcycle of claim 4, further comprising a countershaft assembly mounted transversely to the frame, the countershaft having a driven sprocket on one side of the frame that engages the motor and transmission assembly, and a drive sprocket on an opposite side of the frame that drivably engages the rear wheel assembly.

7. The motorcycle of claim 6, wherein the driven gear engages the motor and transmission assembly through a first chain, and the drive gear engages the wheel assembly through a second chain.

8. The motorcycle of claim 6, wherein the countershaft assembly comprises an axle fixedly attached to the frame, and a cylindrical countershaft body that rotatably engages the axle.

9. The motorcycle of claim 8, wherein the countershaft body engages the axle through a plurality of bearing assemblies.

10. The motorcycle of claim 8 wherein the drive sprocket on the countershaft assembly is positioned to align with a drive gear on the rear wheel assembly.

11. The motorcycle of claim 8, wherein the rear wheel assembly comprises a tire having a width between 200 mm and 300 mm, inclusive.

12. The motorcycle of claim 6, wherein the rear motor mount assembly comprises left and right side plates that are fixedly attached to a motor mounting plate, and left and right adjuster plates that pivotably engage the left and right side plates, and are adjustable to move the left and right side plates horizontally.

13. A motor mount assembly for a motorcycle having a frame and a motor and transmission assembly, the motor mount assembly comprising:
    a first motor mount assembly fixed to the frame and adapted to be attached to a first end of the motor and transmission assembly, the first motor mount assembly being movable horizontally with respect to the frame;
    a second motor mount assembly fixed to the frame and adapted to be attached to a second end of the motor and transmission assembly, the second motor mount assembly being selectively adjustable horizontally with respect to the frame by a predetermined amount.

14. The motor mount assembly of claim 13, wherein the predetermined amount of horizontal adjustment is between about 0.35 inches and 0.75 inches.

15. The motor mount assembly of claim 13, wherein the first and second motor mount assemblies are isolation mount assemblies such that vibrations to the motorcycle frame are damped by the first and second motor mount assemblies.

16. The motor mount assembly of claim 13, wherein the first motor mount assembly is a front motor mount assembly, and the second motor mount assembly is a rear motor mount assembly.

17. The motor mount assembly of claim 13, wherein the first and second motor mount assemblies each comprise a cylindrical bearing sleeve that is fixedly attached to the frame, a pair of bushings having a polymeric outer surface adapted to be inserted into the cylindrical bearing sleeve, and a rigid center member through which the motor engages the first and second mount assemblies.

18. The motor mount assembly of claim 13, further comprising a countershaft assembly mounted transversely to the frame, the countershaft having a driven sprocket on one side of the frame and a drive sprocket on an opposite side of the frame.

19. The motor mount assembly of claim 18, wherein the driven gear engages the motor and transmission assembly through a chain, and the drive gear engages the wheel assembly through a chain.

20. The motor mount assembly of claim 18, wherein the countershaft assembly comprises an axle fixedly attached to the frame, and a cylindrical countershaft body that rotatably engages the axle.

* * * * *